US011157193B2

United States Patent
Xu et al.

(10) Patent No.: US 11,157,193 B2
(45) Date of Patent: Oct. 26, 2021

(54) COHERENCY ISSUE RESOLUTION IN LOGICAL TO PHYSICAL PAGE TRANSLATION IN A MEMORY SUB-SYSTEM

(71) Applicant: Micron Technology, Inc., Boise, ID (US)

(72) Inventors: Peng Xu, Milpitas, CA (US); Jiangang Wu, Milpitas, CA (US); Yun Li, Fremont, CA (US)

(73) Assignee: MICRON TECHNOLOGY, INC., Boise, ID (US)

(*) Notice: Subject to any disclaimer, the term of this patent is extended or adjusted under 35 U.S.C. 154(b) by 23 days.

(21) Appl. No.: 16/715,986

(22) Filed: Dec. 16, 2019

(65) Prior Publication Data
US 2021/0181966 A1 Jun. 17, 2021

(51) Int. Cl.
*G06F 12/00* (2006.01)
*G06F 3/06* (2006.01)
*G06F 12/1009* (2016.01)

(52) U.S. Cl.
CPC .......... *G06F 3/0647* (2013.01); *G06F 3/0604* (2013.01); *G06F 3/0659* (2013.01); *G06F 3/0673* (2013.01); *G06F 12/1009* (2013.01); *G06F 2212/657* (2013.01)

(58) Field of Classification Search
CPC .... G06F 3/0647; G06F 3/0604; G06F 3/0659; G06F 3/0673; G06F 12/1009; G06F 2212/657
See application file for complete search history.

(56) References Cited

U.S. PATENT DOCUMENTS

| 2003/0145165 | A1* | 7/2003 | Herbst | G06F 3/0601 |
| | | | | 711/112 |
| 2020/0241799 | A1* | 7/2020 | Kanno | G06F 3/0611 |
| 2020/0387449 | A1* | 12/2020 | Simionescu | G06F 3/061 |

* cited by examiner

Primary Examiner — John A Lane
(74) Attorney, Agent, or Firm — Lowenstein Sandler LLP (57) ABSTRACT

A write request to program data to a memory device of a memory sub-system is received. An intermediate entry of a data structure is generated, the intermediate entry including a pointer identifying a write buffer associated with an intermediate write operation corresponding to the write request. A read request to read the data from the memory device is received and a look-up operation of the data structure is performed to identify the intermediate entry. Using the pointer to locate the write buffer associated with the intermediate write operation. The write buffer is copied to a read buffer associated with the read request and the read request is executed using the read buffer.

20 Claims, 5 Drawing Sheets

COHERENCY ISSUE RESOLUTION IN LOGICAL TO PHYSICAL PAGE TRANSLATION IN A MEMORY SUB-SYSTEM

TECHNICAL FIELD

Embodiments of the disclosure relate generally to memory sub-systems, and more specifically, relate to coherency issue resolution in logical to physical page translation in a memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to coherency issue resolution in logical to physical page updating in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

In a memory sub-system, a memory sub-system controller maintains mapping information between a range of logical addresses corresponding to logical blocks of a memory device and a range of physical addresses of memory cells of the memory device (also referred to as a "logical-to-physical (L2P) mapping data structure"). For certain memory sub-systems (e.g., solid state devices (SSDs)) a dedicated module (e.g., a flash translation layer (FTL) module) is employed to manage logical to physical address translation. In some cases, translation of a logical address associated with a write operation to write data to a physical address of a target memory device (e.g., a large translation unit (LTU)) occurs during an interval after the L2P table has been updated with the physical address of the target memory device, but before the data is completely written into the memory device of the memory sub-system. Accordingly, since the L2P table has been updated with the physical address of the target memory device, a subsequent read command to read the data stored at the target memory device causes the controller to read the target memory device before the write operation is complete. As a result, the read operation fails due to a lack of coherency between the L2P table and the target memory device. Conventional memory sub-systems attempt to resolve the coherency issue by implementing a separate module in a memory sub-system to manage a hash table to perform a look up operation to determine whether a previous write operation is complete. Traditional memory sub-systems may also employ a coherency checker to search for outstanding write operation to block or prohibit following the identification of a read operation that finishes before the write operation. However, the use of an additional module and corresponding coherency related processing introduces extra cycling and hardware complexity which negatively impact the performance of the memory sub-system.

Aspects of the present disclosure address the above and other deficiencies by having a memory sub-system that implements and manages a data structure including entries relating to intermediate or in-process write operations to resolve coherency issues associated with processing a subsequent read command corresponding to the intermediate write operation. In particular, the data structure (also referred to as an "intermediate data structure or "intermediate L2P table") can include an entry (also referred to as an "intermediate entry" or "intermediate L2P entry") recording information identifying a physical address associated with the intermediate (e.g., in-process) write operation and a pointer identifying a write buffer (e.g., stored in data cache) associated with the intermediate write operation (e.g., a write operation that is incomplete, such that the data has not yet been written to a target memory device in the physical media of the memory sub-system). Upon receipt of a read command, the controller performs a look-up operation using the data structure to identify the corresponding intermediate entry. The controller retrieves the intermediate entry and uses the stored pointer to locate a write buffer (e.g., an address in cache) including the data associated with the intermediate write operation. The controller copies the write buffer to the read buffer and services the received read command. The read command is serviced using the data stored in the updated read buffer.

Advantages of the present disclosure include, but are not limited to, generating an intermediate entry in a data structure to resolve coherency issues associated with a read command corresponding to an intermediate write command. The data structure is optimized by storing the intermediate entry including a pointer to a cache address associated with a write buffer corresponding to the intermediate write request. Advantageously, a subsequent read request received from a host system while the write command is in-process (i.e., not yet completed) can be serviced by copying contents of the write buffer to a read buffer corresponding to the read request. In so doing, read request execution failures associated with the aforementioned coherency issues relating to the use of a conventional L2P data structure to service read requests corresponding to intermediate write operations are avoided.

Figure 1:
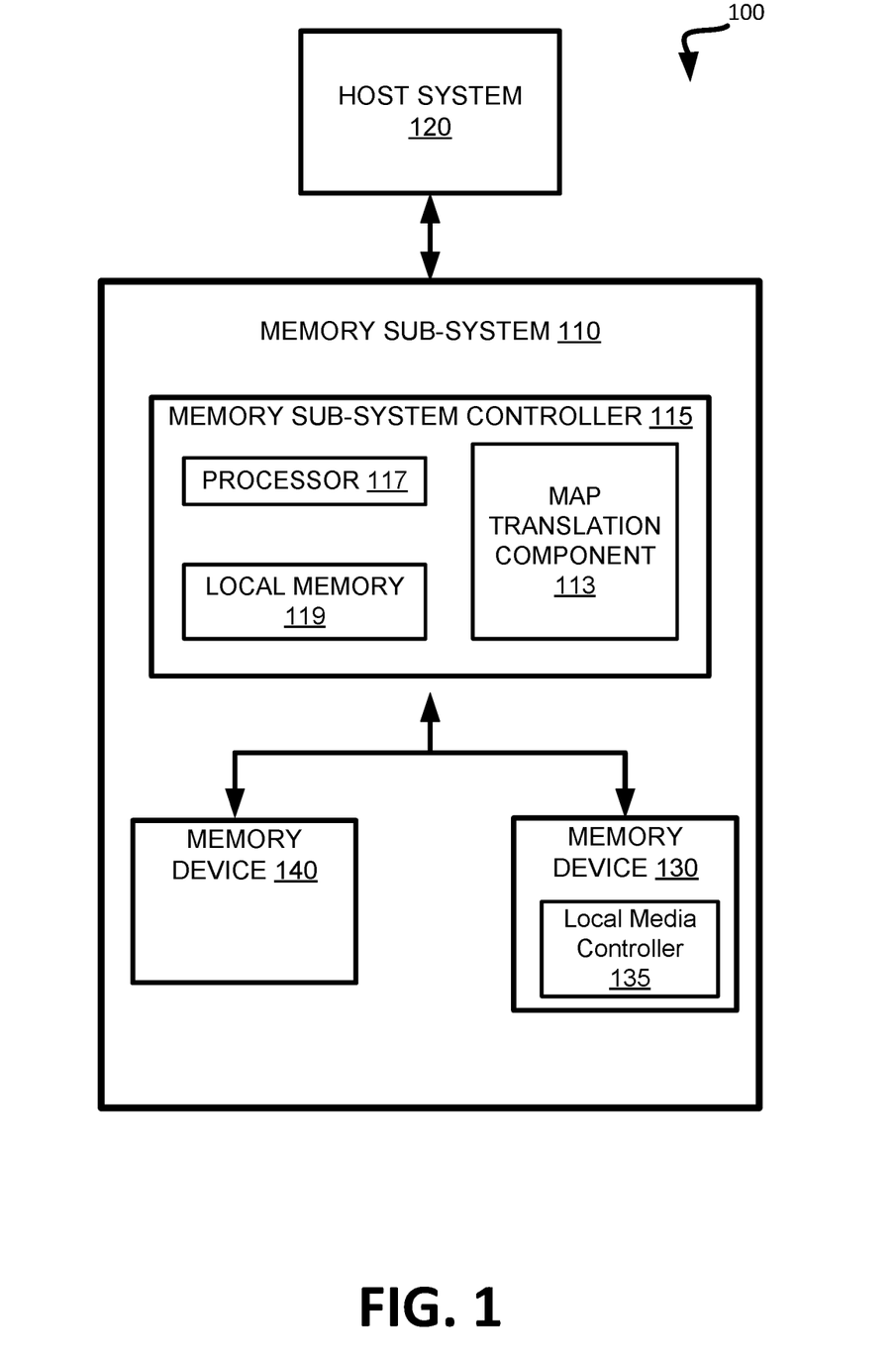
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and a non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be a computing device such as a desktop computer, laptop computer, network server, mobile device, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes a negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point type and NAND type flash memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a map translation component 113 that can be used to manage a data structure including mapping information associating logical addresses and physical addresses of a memory sub-system. In some embodiments, the memory sub-system controller 115 includes at least a portion of the map translation component 113. For example, the memory sub-system controller 115 can include a processor 117 (processing device) configured to execute instructions stored in local memory 119 for performing the operations described herein. In some embodiments, the map translation component 113 is part of the host system 120, an application, or an operating system. In the same or alternative embodiments, portions of the map translation component 113 are part of the host system 120 while other portions of the map translation component 113 are performed at the memory sub-system controller 115.

The map translation component 113 can be used to manage a data structure (e.g., a table) including logical address to physical address mapping information associated with a memory sub-system. In an embodiment, the map translation component 113 generates an entry (also referred to as an "intermediate entry") for inclusion in the data structure (also referred to as the "L2P table" or "L2P mapping data structure") that includes additional information (also referred to as "intermediate information") associated with an L2P mapping. In an embodiment, in response to receipt of a write request from the host system 120 to write data to a memory device of a memory device 140 of the memory sub-system 110, the map translation component 113 generates and stores the intermediate entry in the L2P table. The intermediate entry includes an identifier (herein referred to as a "pointer") identifying a write buffer address (e.g., a location in cache) associated with the in-process write request. In an embodiment, an in-process write operation includes a requested write operation while it is pending (i.e., before the media write is completed).

In response to a receipt of a subsequent request to read the data of the in-process write operation, the map translation component 113 performs a look-up operation using the L2P data structure to identify the corresponding intermediate entry. Using the pointer identified in the intermediate entry, the map translation component 113 locates the write buffer storing data associated with the in-process write operation. The map translation component 113 copies the write buffer to a read buffer associated with the read request, and the read request is serviced from the read buffer. Use of the intermediate entry in the L2P data structure resolves coherency issues that arise in conventional L2P mapping techniques. Further details with regards to the operations of the map translation component 113 are described below.

Figure 2:
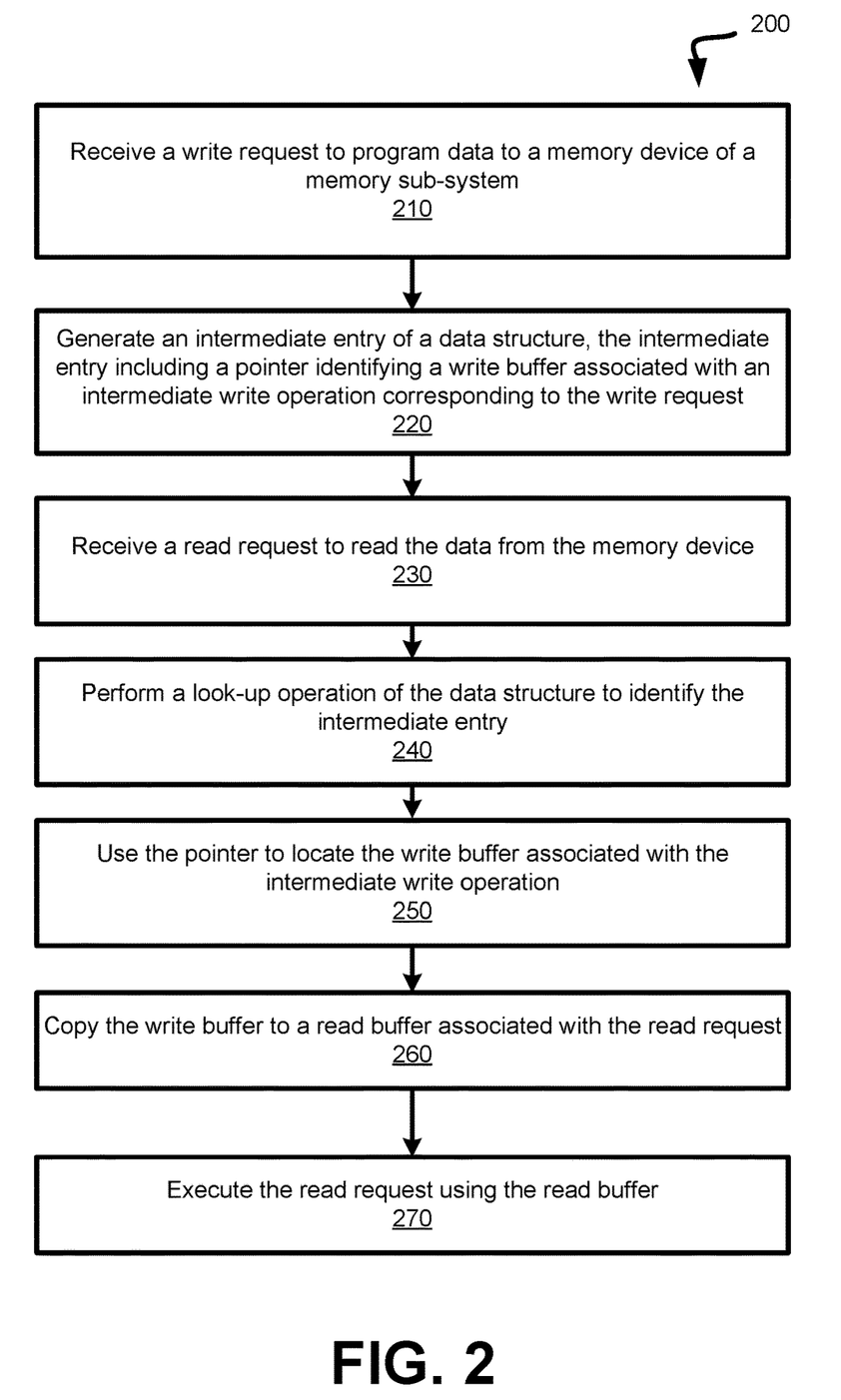
FIG. 2 is a flow diagram of an example method to manage a data structure including an entry associated with an intermediate write operation in accordance with some embodiments.

FIG. 2 is a flow diagram of an example method 200 to generate an entry of a data structure for use in servicing a read request corresponding to an intermediate or in-process write operation in accordance with some embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the map translation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 210, the processing logic receives a write request to program data to a memory device of a memory sub-system. In an embodiment, the write request is received from a host system and identifies a logical block address associated with the program operation. The processing logic maintains a data structure (also referred to as an "L2P mapping data structure" or "L2P table") configured to map a range of logical addresses to a corresponding range of physical addresses of the memory sub-system.

At operation 220, the processing logic generates an intermediate entry of a data structure, the intermediate entry including a pointer identifying a write buffer associated with an intermediate write operation corresponding to the write request. In an embodiment, the intermediate entry is an entry in an L2P mapping data structure. In an embodiment, the intermediate entry identifies an address of the write buffer storing data associated with the intermediate or in-process write operation during its pendency of the write operation (e.g., before the write operation has been completed and the corresponding data has been written to the target physical location of the memory sub-system. In an embodiment, the intermediate entry includes a pointer (e.g., a tag or other identifier including address corresponding to a write buffer storing data associated with the intermediate write operation). In an embodiment, the pointer may include a system managed tag (also referred to as a "systag") having one or more additional bits that can be used to store information identifying the intermediate write operation. In an embodiment, the pointer identifies a write buffer address in cache storing the data associated with the intermediate write operation.

In an embodiment, the data structure can include normal or standard entries. The standard entries can relate to memory locations that are not involved in an in-process write request. The standard entries (also referred to as "standard L2P entries") can include map translation information relating to a logical address to a physical address, including a logical block address header, a plan number of the logical block address header, a logical unit number (LUN), and physical block address information (e.g., page and block identifiers). In an embodiment, upon receipt of the write request, the processing logic can check if the corresponding entry in the data structure is a standard entry or an intermediate entry (i.e., associated with an intermediate write operation). In an embodiment, the processing logic can identify the entry corresponding to the write request is a standard entry, generate the intermediate entry, and store the intermediate entry in the data structure. In an embodiment, the processing logic can identify the entry corresponding to the write request is an intermediate entry (e.g., the entry relates to another intermediate write operation), the processing logic can replace the pointer of the current intermediate entry with updated pointer associated with the write request received in operation 210.

In operation 230, the processing logic receives a read request to read the data from the memory device. In an embodiment, the read request is received from the host system and includes a request to read the data from the target memory device. In an embodiment, the read request includes information identifying a physical address of the memory sub-system to be read.

In operation 240, the processing logic performs a look-up operation of the data structure to identify the intermediate entry. In an embodiment, the processing logic uses the physical address information to identify the corresponding intermediate entry.

In operation 250, the processing logic use the pointer to locate the write buffer associated with the intermediate write operation. As described above, the intermediate entry includes the pointer information, which can be used to identify the location of the write buffer including data associated with the intermediate write operation. In an embodiment, using the pointer, the processing logic can determine if the write buffer is valid. If the write buffer is not valid, the processing logic determines that the transfer from the write buffer to the target memory device is complete (i.e., the write buffer has been released). In this case, the processing logic can use the physical address information stored in the data structure and execute the read operation.

In operation 260, the processing logic copies the write buffer to a read buffer associated with the read request. In operation 270, the processing logic executes the read request using the read buffer. In an embodiment, the read request is serviced using the read buffer, which contains the contents copied from the write buffer in operation 260. Advantageously, the processing logic can service the read request corresponding to the data that is subject to the intermediate write operation.

Figure 3:
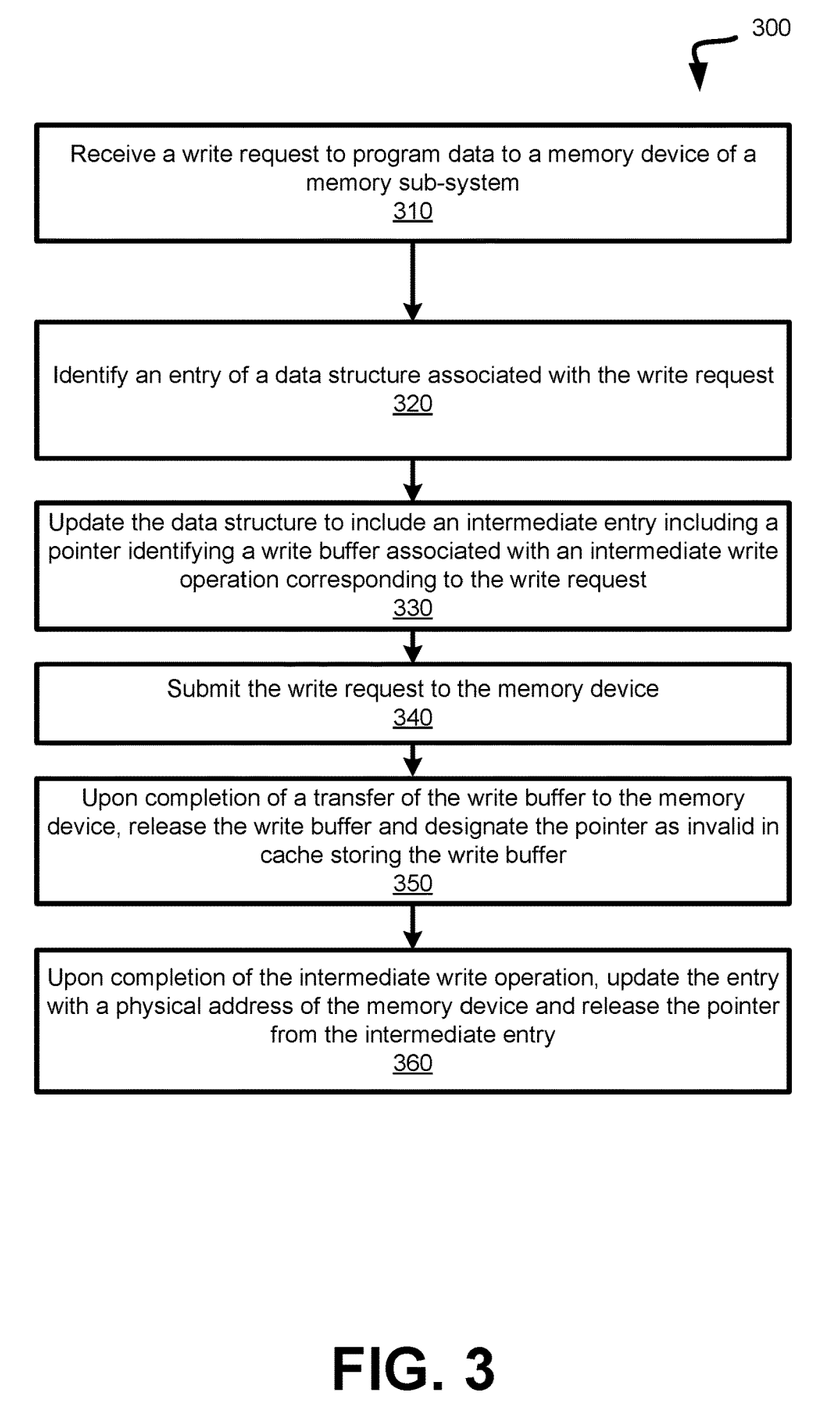
FIG. 3 is a flow diagram of an example method is a flow diagram of an example method to manage a data structure including an entry associated with an intermediate write operation in accordance with some embodiments.

FIG. 3 is a flow diagram of an example method 300 to manage a data structure including an intermediate entry corresponding to an intermediate or in-process write operation in accordance with some embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the map translation component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 3, at operation 310, the processing logic receives a write request to program data to a memory device of a memory sub-system. In an embodiment, the write request includes data to be written to a physical location (e.g., one or more memory devices) of the memory sub-system.

In operation 320, the processing logic identifies an entry of a data structure associated with the write request. In an embodiment, the processing logic identifies the entry using a logical block address identified from the write request received from the host system. In an embodiment, the processing logic can identifies the entry as a standard entry (e.g., the entry does not include an intermediate entry with a pointer to an intermediate write operation). In an embodiment, the processing logic can determine that the corresponding entry in the data structure is an intermediate entry (e.g., a first intermediate entry), and replace the pointer information of the first intermediate entry with an updated pointer associated with the new write request (i.e., to generate a second intermediate entry to replace the first intermediate entry).

In operation 330, the processing logic updates the data structure to include an intermediate entry including a pointer identifying a write buffer associated with the intermediate write operation. In an embodiment, the processing logic stores the intermediate entry in the data structure in response to identifying the corresponding entry as a standard entry, in operation 320.

In operation 340, the processing logic submits the write request to the memory device (e.g., the write request is submitted to the backend for completion of the programming operation). In an embodiment, the submission the write request to the backend includes the transfer of the write buffer to the physical memory device.

In operation 350, upon completion of a transfer of the write buffer to the memory device, the processing device releases the write buffer and designates the pointer as invalid in cache storing the write buffer.

In operation 360, upon completion of the intermediate write operation, the processing device updates the entry with a physical address of the memory device and releases the pointer from the intermediate entry. In an embodiment, when the program operation is completed, if the stored pointer in the intermediate entry matches, the intermediate entry is updated with the physical address, thereby converting the intermediate entry to a standard entry (e.g., an entry without a pointer to an intermediate write operation). In an embodiment, the processing logic can decrease a valid page count (VPC) of a memory block number stored in the intermediate entry and increase the VPC of a new block (e.g., the block associated with the completed write operation). In an embodiment, if the stored pointer in the intermediate entry does not match, the processing logic can determine the logical block is over-written by another operation, and determine that the mapping information is invalid. In an embodiment, if the entry is not an intermediate entry, the processing logic can determine the mapping information is invalid in view of the valid mapping information stored in the standard entry of the data structure.

Figure 4:
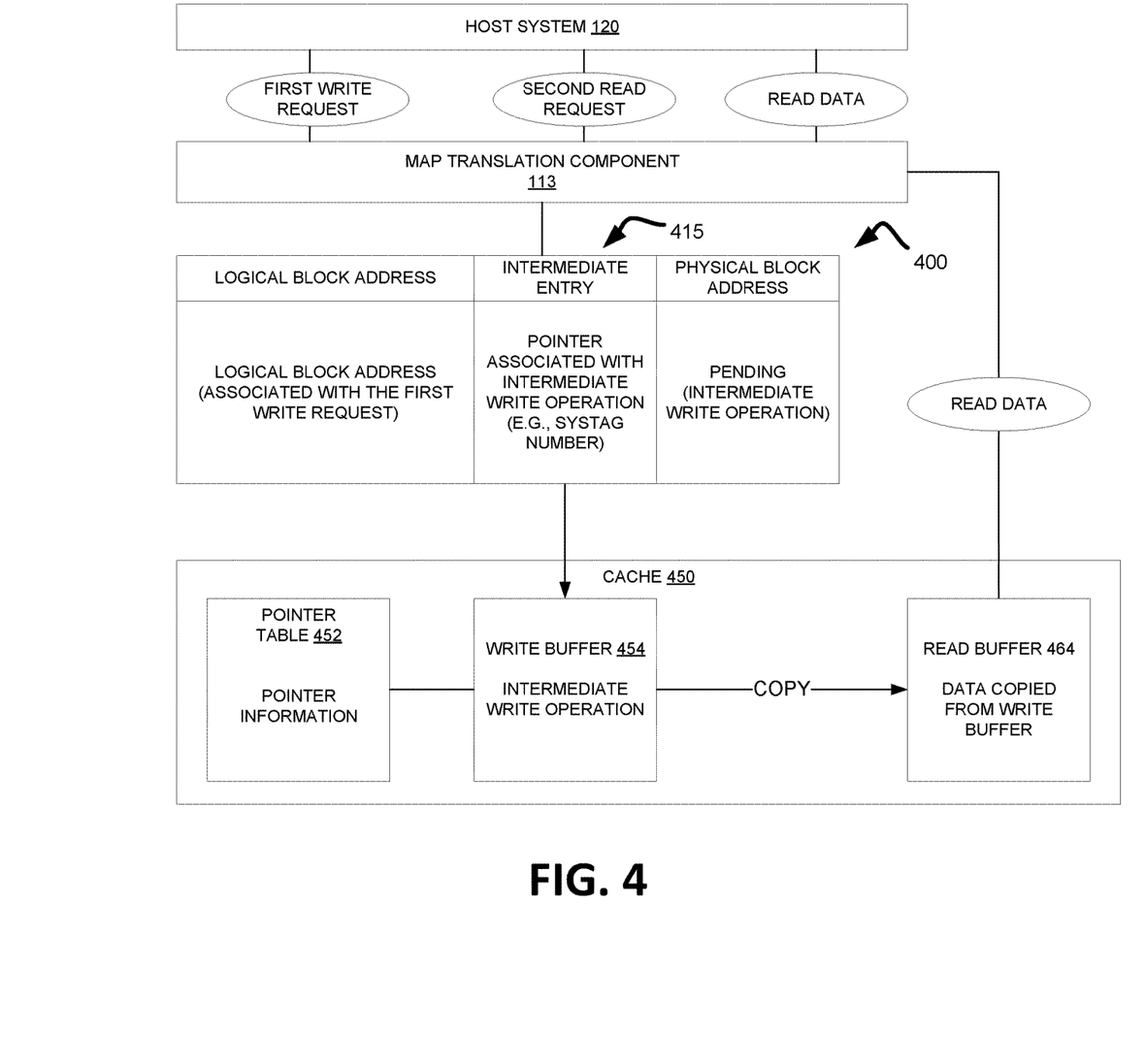
FIG. 4 illustrates an example map translation component managing a data structure including an intermediate entry associated with an intermediate write operation in accordance with some embodiments.

FIG. 4 illustrates an example data structure 400 managed by a map translation component 113 in accordance with embodiments. As shown in FIG. 4, the map translation component 113 is configured to receive a first write request from a host system 120. The first write request includes instructions to perform a write operation to program data to a physical page of a memory sub-system. The write request identifies a logical block address associated with one or more logical blocks of the memory sub-system. The map translation component 113 employs the data structure 400 to translate the logical block address to a corresponding physical block address. To enable the map translation component 113 to monitor an intermediate write operation corresponding to the first write request during the pendency of the write operation, the map translation component 113 generates and stores an intermediate entry 415 in the data structure 400. The intermediate entry 415 includes a pointer or other identifier identifying an address in cache 450 of a write buffer 454 associated with the intermediate write operation. In an embodiment, the pointer is a system managed tag (or "systag") number including one or more bits to identify the location of the write buffer including data associated with the intermediate write operation.

In an embodiment, upon receipt of a second read request from the host system 120, the map translation component 113 performs a look-up operation to identify the corresponding entry in the data structure 400. The write request is referred to as "first" since it precedes the "second" read request. In an embodiment, the second read request identifies the logical block address associated with the first write request. In an embodiment, since there is an intermediate write operation associated with the identified logical block address, the map translation component 113 identifies the stored pointer associated with the intermediate write operation. In an embodiment, the physical block address entry stored in the data structure 400 can identify the physical block address is "pending" to signal to the map translation component 413 that the data has not yet been written to the physical memory device of the memory sub-system. As shown in FIG. 4, a pointer table 452 (or other data structure) can be stored in the cache 450 and include pointer information associated with each intermediate write operation.

In an embodiment, using the pointer, the map translation component 113 identifies the write buffer 454 in the cache 450 using the pointer. The map translation component 113 copies the write buffer 454 to a read buffer 456 corresponding to the second read request. The map translation component 113 services the second read request using the data stored in the read buffer 464. In an embodiment, in response to the transfer of the first write request to the physical memory of the memory sub-system, the map translation component 113 can release the write buffer 454 and mark, tag, or label the write buffer 454 as "invalid" in the pointer table 452. In an embodiment, upon completion of the write operation, the map translation component 113 can determine the pointer stored in the intermediate entry 415 matches the pointer information stored in the pointer table 452 and update the physical block address entry in the data structure 400 with the physical address corresponding to the programmed data.

In an embodiment, if, upon completion of the write operation, the map translation component 113 determines the pointer stored in the intermediate entry 415 does not match the pointer information stored in the pointer table 452, the map translation component 113 determines the logical block has been over-written by another operation, and, as such, the mapping information is invalid.

Figure 5:
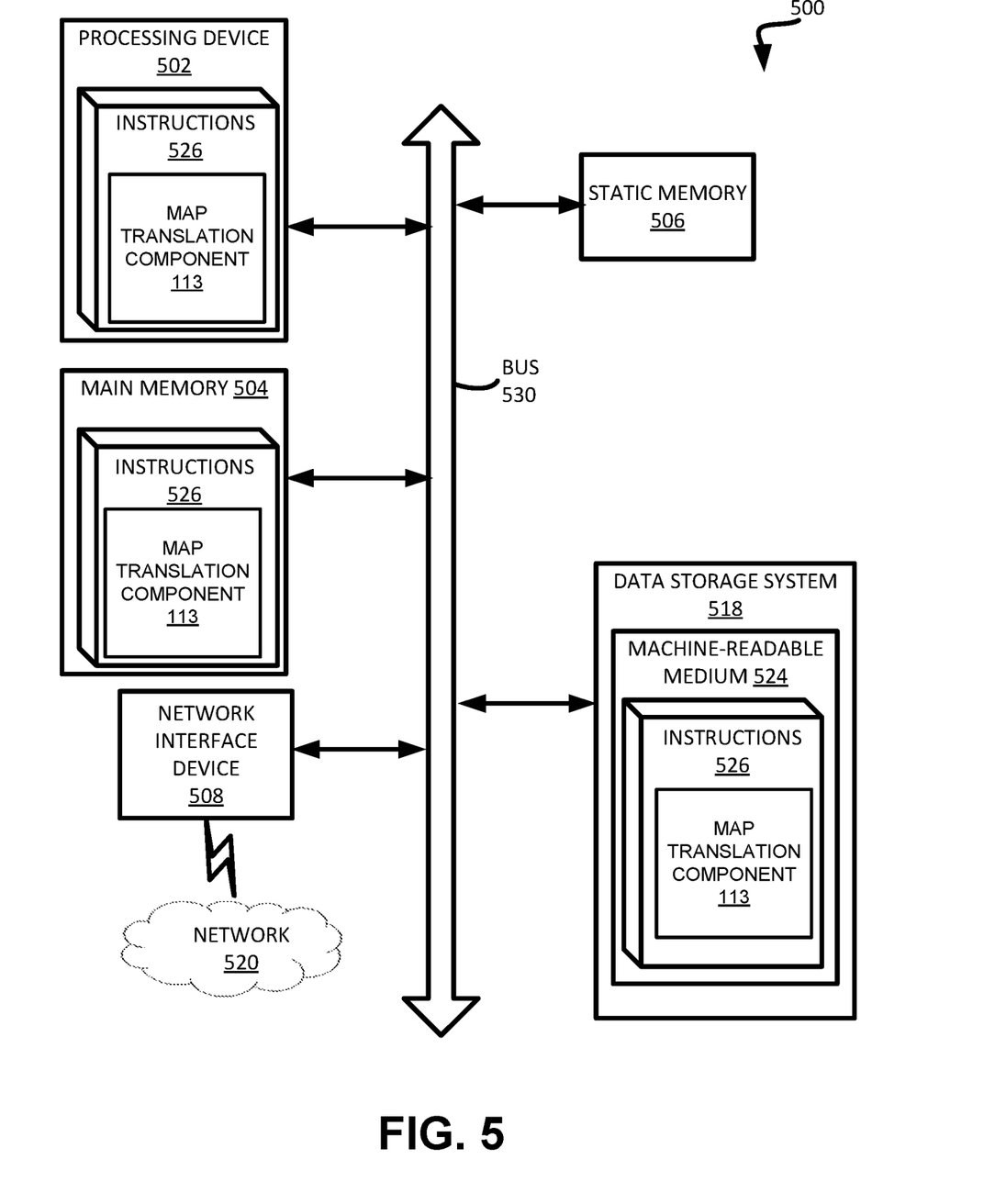
FIG. 5 is a block diagram of an example computer system in which implementations of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a map translation component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a map translation component (e.g., the map translation component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving, by a processing device, a write request to program data to a memory device of a memory sub-system;
generating an intermediate entry of a data structure comprising a logical-to-physical (L2P) address mapping corresponding to the write request, the intermediate entry including a pointer identifying a write buffer associated with an intermediate write operation corresponding to the write request;
receiving a read request to read the data from the memory device;
performing a look-up operation of the data structure to identify the intermediate entry;
using the pointer to locate the write buffer associated with the intermediate write operation;

copying the write buffer to a read buffer associated with the read request; and executing the read request using the read buffer.

2. The method of claim 1, further comprising:

transferring contents of the write buffer to the memory device;

releasing the write buffer; and designating the pointer as invalid in a cache memory storing the write buffer.

3. The method of claim 1, wherein the read request is received prior to completion of the intermediate write operation.

4. The method of claim 1, further comprising storing the write buffer in a cache memory of the memory sub-system.

5. The method of claim 1, further comprising transferring the write request to the memory device to complete the intermediate write operation.

6. The method of claim 1, further comprising storing an additional data structure comprising the pointer identifying the write buffer associated with the intermediate write operation.

7. A non-transitory computer readable medium comprising instructions, which when executed by a processing device, cause the processing device to perform operations comprising:

receiving, from a host system, a write request to program data to a memory device of a memory sub-system;

generating an intermediate entry of a data structure comprising a logical-to-physical (L2P) address mapping corresponding to the write request, the intermediate entry including a pointer identifying a write buffer associated with an intermediate write operation corresponding to the write request;

receiving, from the host system, a read request to read the data from the memory device, and using the pointer to locate the write buffer associated with the intermediate write operation.

8. The non-transitory computer readable medium of claim 7, the operations further comprising copying data from the write buffer to a read buffer associated with the read request.

9. The non-transitory computer readable medium of claim 8, the operations further comprising executing a read operation corresponding to the read request using data from the read buffer.

10. The non-transitory computer readable medium of claim 9, the operations further comprising:

identifying, using a logical address identified by the write request, an entry of the data structure including a physical address associated with the write request.

11. The non-transitory computer readable medium of claim 10, the operations further comprising updating the entry to include the intermediate entry.

12. The non-transitory computer readable medium of claim 7, the operations further comprising:

transferring contents of the write buffer to the memory device;

releasing the write buffer; and designating the pointer as invalid in a cache memory storing the write buffer.

13. The non-transitory computer readable medium of claim 7, the operations further comprising:

completing the intermediate write operation;

updating the intermediate entry to include a physical address of the memory device; and releasing the pointer from the intermediate entry.

14. The non-transitory computer readable medium of claim 7, the operations further comprising:

performing a look-up operation using the data structure to identify an entry;

determining the entry comprises a stored intermediate entry; and replacing the stored intermediate entry with the intermediate entry comprising the pointer.

15. A system comprising:

a memory device; and a processing device, operatively coupled with the memory device, to:

receive a write request to program data to the memory device;

generate an intermediate entry of a data structure comprising a logical-to-physical (L2P) address mapping corresponding to the write request, the intermediate entry including a pointer identifying a write buffer associated with an intermediate write operation corresponding to the write request;

receive a read request to read the data from the memory device;

perform a look-up operation of the data structure to identify the intermediate entry;

use the pointer to locate the write buffer associated with the intermediate write operation;

copy the write buffer to a read buffer associated with the read request; and execute the read request using the read buffer.

16. The system of claim 15, wherein the processing device is further to:

transfer contents of the write buffer to the memory device;

release the write buffer; and designate the pointer as invalid in a cache memory storing the write buffer.

17. The system of claim 15, wherein the read request is received prior to completion of the intermediate write operation.

18. The system of claim 15, wherein the processing device is further to store the write buffer in a cache memory.

19. The system of claim 15, wherein the processing device is further to transfer the write request to the memory device to complete the intermediate write operation.

20. The system of claim 15, wherein the processing device is further to store, in a cache memory, an additional data structure comprising the pointer identifying the write buffer associated with the intermediate write operation.

* * * * *